Sept. 26, 1961   M. S. WORLEY   3,001,604
METHOD AND APPARATUS FOR DEHYDRATING
OIL AND WATER EMULSIONS
Filed May 28, 1958                                2 Sheets-Sheet 1

INVENTOR.
MARVIN S. WORLEY
BY
Jack R. Springgate
ATTORNEY

Sept. 26, 1961

M. S. WORLEY 3,001,604

METHOD AND APPARATUS FOR DEHYDRATING
OIL AND WATER EMULSIONS

Filed May 28, 1958

INVENTOR.
MARVIN S. WORLEY
BY
Jack Springete
ATTORNEY

United States Patent Office 3,001,604
Patented Sept. 26, 1961

3,001,604
METHOD AND APPARATUS FOR DEHYDRATING OIL AND WATER EMULSIONS
Marvin S. Worley, Oklahoma City, Okla., assignor to Black, Sivalls & Bryson, Inc., Kansas City, Mo., a corporation of Delaware
Filed May 28, 1958, Ser. No. 738,544
8 Claims. (Cl. 183—2.7)

The present invention relates generally to a method and apparatus for the removal of water and light hydrocarbons from a crude oil and water emulsion.

Prior to the present invention the dehydration of crude oil and water emulsions has been accomplished in many different ways including settling, heating, electrical precipitation and chemical treatment. Each of the above-mentioned systems has enjoyed some degree of commercial acceptance and many devices have been built embodying a combination of several of the systems. Acceptable dehydration of crude oil and water emulsions has previously been accomplished in many of these systems except where it is necessary to remove a large number of small water particles from the crude oil. Also, previous systems have had only limited success in dehydrating the so-called tight emulsions. Therefore, the primary object of the present invention is to provide a novel method and apparatus for dehydrating crude oil and water emulsion.

A further object of the present invention is to provide a method and apparatus for dehydrating crude oil and water emulsions including the removal of the smaller water particles from the crude oil. A still further object of the present invention is to provide a novel method and apparatus for the dehydration and partial stabilization at the respective wellheads of a plurality of well streams flowing crude oil and water emulsions. Still another object of the present invention is to provide a novel method and apparatus for dehydrating crude oil and water emulsions by contacting such emulsions with a relatively dry gas stream.

In accomplishing these and other objects of the present invention I have provided improved method and apparatus illustrated in the accompanying drawings wherein.

Figure 1:
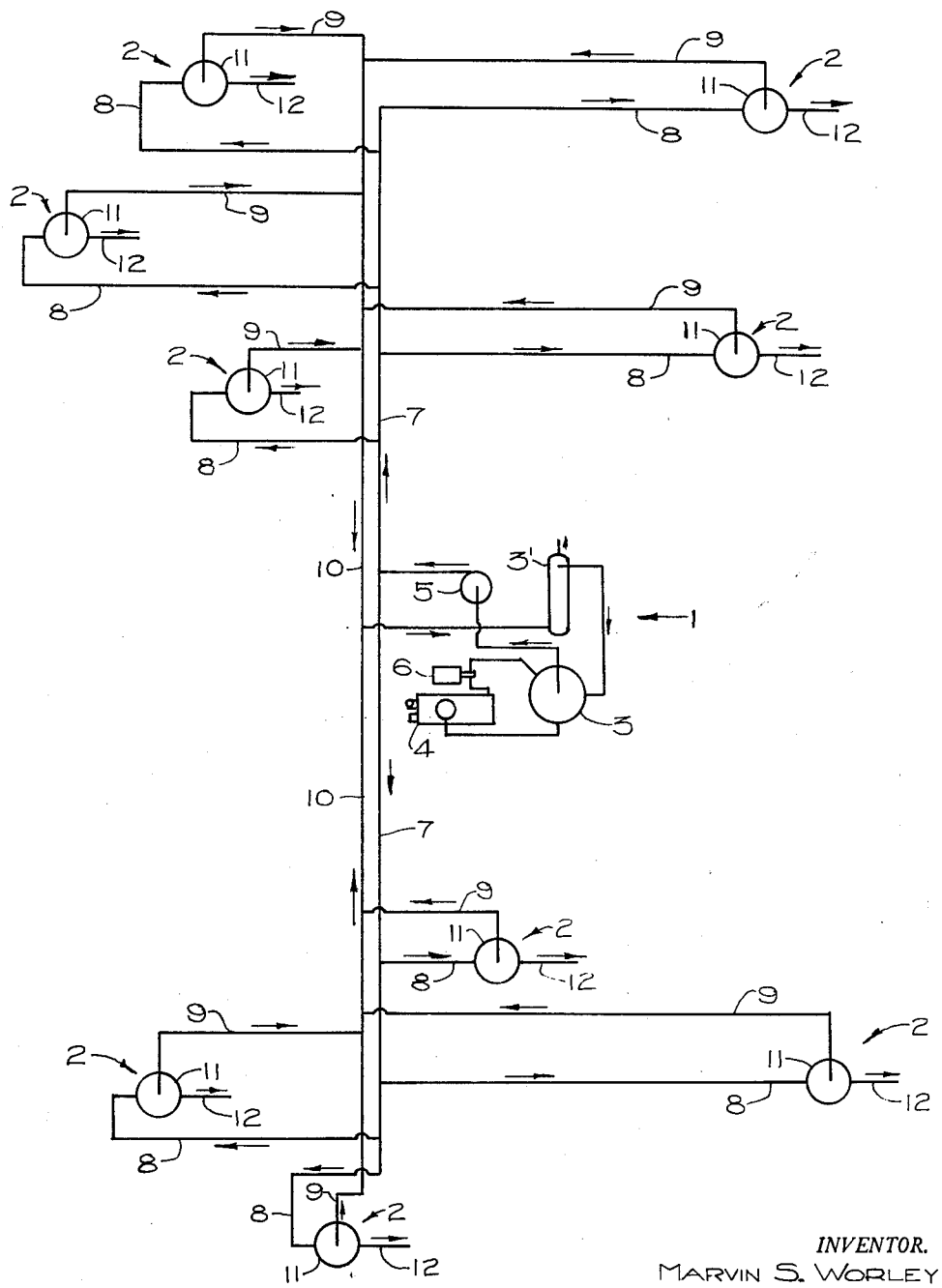
FIG. 1 is a schematic view of a system for dehydrating a plurality of well streams flowing crude oil and water.

Referring more in detail to the drawings:

The system illustrated in FIG. 1 comprises central plant 1 and a plurality of wellhead dehydration units 2. Central plant 1 comprises contacting tower 3, separator 3', dehydrating agent reconcentrator 4, compressor 5 and dehydrating agent circulating pump 6. Dry gas headers 7 connect from compressor 5 to dry gas lines 8 which connect to individual units 2. Return lines 9 connect from individual units 2 to return headers 10 which connect to separator 3' in central plant 1.

Thus, in operation dry gas is delivered from contactor 3, through compressor 5, dry gas headers 7 and dry gas lines 8 to contacting vessels 11 at each wellhead dehydration unit 2. The crude oil, after being dehydrated and partially stabilized in contacting vessels 11, is discharged therefrom through discharge lines 12 to suitable storage or a pipeline (not shown). The wet gas is discharged from contacting vessels 11 through return lines 9 and return headers 10 into separator 3' where water and hydrocarbon condensate are separated from the gas stream. The parital stabilization is accomplished by the stripping action of the gas in contacting vessels 11. Therefore, it is desirable to remove as much of the condensable hydrocarbons as possible in separator 3' so that only a lean dry gas is circulated to the individual units 2. Additional cooling of the drying gas stream or other means of removing the condensable hydrocarbons such as contacting the stream with a lean absorption oil ahead of separator 3' may be desirable in many installations in order to accomplish a more adequate stabilization of the crude oil. A by-product of subh stabilization will be a natural gasoline which may be discharged from separator 3' to a suitable storage or pipeline (not shown). The partial stabilization and the dehydration of the crude oil may also be aided by heating the lean dry gas prior to its introduction into contacting vessel 11. Heating may be accomplished in some circumstances by a heat exchange between the lean dry gas in line 8 and the warm dehydrated crude flowing through line 12. This heating will increase the amount of water and lighter hydrocarbons which the gas can strip from the crude oil. The gas, free of condensate, is conducted into contacting tower 3 where it is dried by intimate contact with a dehydrating agent such as triethylene glycol. The dried gas is delivered to compressor 5 for recirculation to wellhead dehydrating units 2. The dehydrating agent is continually removed from the lower portion of contacting tower 3 and delivered to reconcentrator 4. Reconcentrated dehydrating agent is delivered to dehydrating agent circulating pump 6 which continually pumps the desired amount of reconcentrated dehydrating agent to contacting tower 3.

Figure 2:
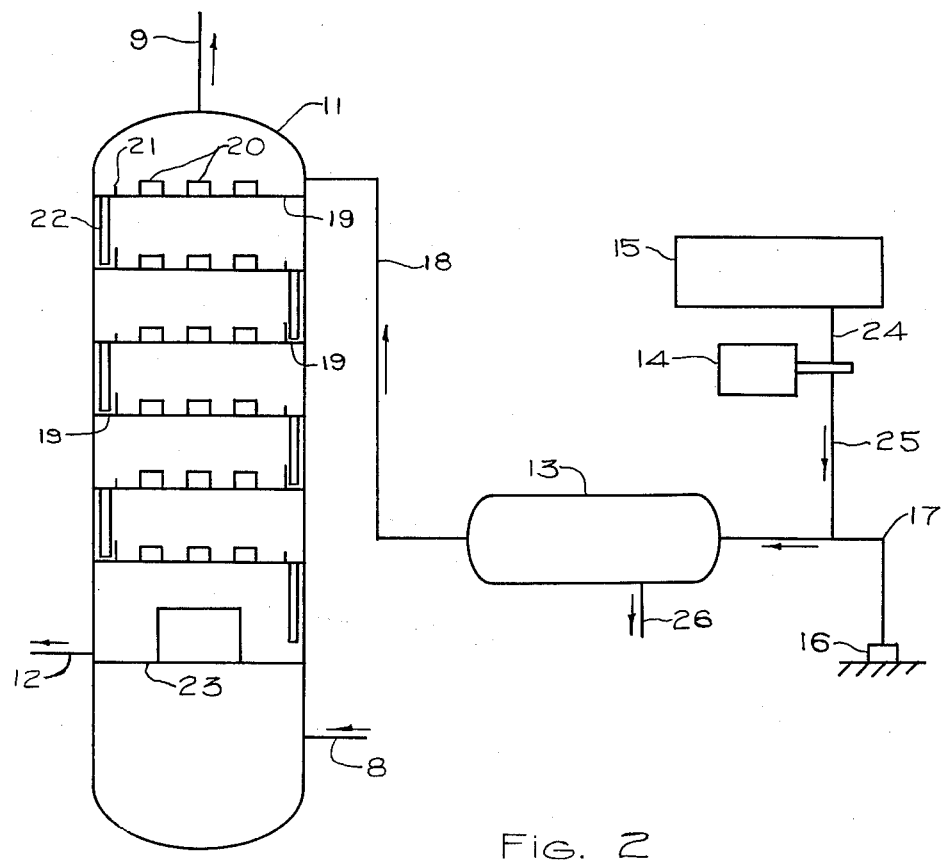
FIG. 2 is a schematic view of one of the individual well-head installations of the system illustrated in FIG. 1.

A typical wellhead dehydration unit 2 is illustrated in FIG. 2 and comprises contacting vessel 11, separator 13, chemical injector 14 and chemical storage reservoir 15. Wellhead 16 is shown to be connected to separator 13 by line 17. Line 18 connects from separator 13 into contacting vessel 11 above contacting trays 19. Each of contacting trays 19 is provided with suitable contacting means such as bubble caps 20, an overflow weir 21 and a downcomer 22 to assure intimate contact between the crude oil and water emulsion and the lean dry gas. Chimney tray 23 is positioned in contacting vessel 11 below contacting trays 19. Discharge line 12 is connected into contacting vessel 11 at a position slightly above chimney tray 23 to discharge the dehydrated crude oil from contacting vessel 11. Line 24 connects chemical storage reservoir 15 to the intake port of chemical injector 14 and line 25 connects the discharge port of chemical injector 14 into line 17 ahead of separator 13. Separator 13 is provided with a water discharge duct 26.

In operation, unit 2 delivers the crude oil and water emulsion production from wellhead 16 to separator 13. Suitable chemical is added ahead of separator 13 by chemical injector 14 to aid in initial removal of the large water drops in the emulsion. Separator 13 allows the large drops of water to settle out of the emulsion and discharges this settled water with the free water through water discharge duct 26 to suitable disposal means (not shown). The crude oil emulsion and gas are delivered from separator 13 through line 18 onto uppermost contacting tray 19 in contacting vessel 11. The lean dry gas enters contacting vessel 11 through dry gas line 8, is contacted intimately with the crude oil and emulsion on each of contacting trays 19 and is discharged therefrom through return line 9 together with any gas separating from the influent emulsion stream in the upper portion of contacting vessel 11. The dehydrated, partially stabilized crude oil is discharged from contacting vessel 11 through discharge line 12.

It should be noted that since the amount of gas in the system will increase with the operation of the system of the present invention, a portion of this gas can be used to power chemical injector 14, dehydrating agent circulating pump 6, dehydrating agent reconcentrator 4 and compressor 5. Preferably, any gas to be used in this manner should be removed from the dry portion of the system in order to assure trouble free operation of these components. It is also contemplated by the present invention that in some applications additional power media will be needed to power these components but usually sufficient solution gas will be obtained from the production crude oil for the operation of chemical injector 14 and dehydrating agent pump 6.

A particular advantage of the present invention is the partial stabilization of the crude production by the stripping action of the lean dry gas contacting the emulsion. This contact will cause further release of the normally gaseous lighter ends in the crude in addition to the separation of the gas in the upper portion of contacting vessel 11.

Thus, my present invention has provided a novel method and apparatus for dehydrating and partially stabilizing crude oil and water emulsions produced from a plurality of wells by contacting such emulsions with a lean dry gas.

What I claim and desire to secure by Letters Patent is:

1. The method of dehydrating crude oil and water emulsion comprising, flowing said emulsion into a contacting zone, intimately contacting said emulsion in said contacting zone with a dried hydrocarbon gas stream to dehydrate said emulsion, discharging the dehydrated crude oil from said contacting zone, discharging said hydrocarbon gas from said contacting zone subsequent to its intimate contact with said emulsion, drying said discharged hydrocarbon gas, and recirculating said dried hydrocarbon gas to said contacting zone.

2. The method of dehydrating and partially stabilizing the crude oil in a crude oil and water emulsion comprising, flowing said emulsion into a contacting zone, intimately contacting said emulsion in said contacting zone with a lean dried hydrocarbon gas stream to dehydrate said emulsion and to strip some of the lighter hydrocarbon fractions from said emulsion, discharging the dehydrated and partially stabilized crude oil from said contacting zone, discharging the hydrocarbon gas stream from said contacting zone subsequent to its intimate contact with said emulsion, removing the condensable hydrocarbon fractions from said discharged hydrocarbon gas stream, drying said hydrocarbon gas stream and recirculating said lean dried hydrocarbon gas stream to said contacting zone.

3. A system for dehydrating a plurality of well stream oil and water emulsions comprising, a central hydrocarbon gas dehydrating unit, a compressor, a contacting vessel near each wellhead which produces an emulsion to be dehydrated, means conducting dried hydrocarbon gas from said central unit to each of said contacting vessels, and means returning hydrocarbon gas from said contacting vessels to said central unit.

4. Apparatus for dehydrating a crude oil and water emulsion comprising, a contacting vessel, an emulsion inlet into the upper portion of said vessel, an emulsion outlet from the lower portion of said vessel, a dry gas inlet into the lower portion of said vessel, a gas outlet from the upper portion of said contacting vessel, gas dehydrating means, means connecting said gas outlet to said gas dehydrating means, and means connecting said gas dehydrating means to said gas inlet.

5. The method of dehydrating a plurality of crude oil and water emulsion streams flowing from a plurality of oil wells comprising, flowing each of said emulsion streams into an individual well stream contacting zone, contacting said emulsion streams in each of said individual well stream contacting zones with a dried hydrocarbon gas stream to dehydrate said emulsion streams, discharging the dehydrated crude oil from each individual well stream contacting zone, discharging said hydrocarbon gas streams from each individual well stream contacting zone, flowing said hydrocarbon gas streams discharged from each individual well stream contacting zone to a gas processing zone, removing condensable vapors from said hydrocarbon gas streams and recirculating said hydrocarbon gas streams to sail individual well stream contacting zones.

6. The method according to claim 5 including, separating the condensed hydrocarbon liquids from the condensed water removed from said hydrocarbon gas stream.

7. Apparatus for dehydrating a plurality of crude oil and water emulsion streams flowing from a plurality of oil wells comprising, a plurality of contacting vessels, each of said oil wells having one of said contacting vessels into which the well stream from the oil well is conducted, means for conducting a dried hydrocarbon gas to each of said contacting vessels, a gas dehydrator, means connecting each of said contacting vessels to said gas dehydrator to conduct said gas from said contacting vessel to said gas dehydrator.

8. Apparatus according to claim 7 including, means for condensing the condensable hydrocarbons in said gas streams from said contacting vessels and means for separately collecting said condensed hydrocarbons.

References Cited in the file of this patent

UNITED STATES PATENTS

| | | |
|---|---|---|
| 306,965 | Seymour | Oct. 21, 1884 |
| 1,848,125 | Grisbaum | Mar. 8, 1932 |
| 1,872,958 | Johnson | Aug. 23, 1932 |
| 1,879,849 | Hunter | Sept. 27, 1932 |
| 2,235,639 | Koch | Mar. 18, 1941 |
| 2,780,304 | Pew et al. | Feb. 5, 1957 |
| 2,860,815 | Finn et al. | Nov. 18, 1958 |

FOREIGN PATENTS

| | | |
|---|---|---|
| 419,868 | Germany | Oct. 12, 1925 |
| 817,450 | Germany | Oct. 18, 1951 |